(12) United States Patent
Fok et al.

(10) Patent No.: US 7,890,299 B2
(45) Date of Patent: Feb. 15, 2011

(54) PROVIDING EVENT-CONTROLLED CONTINUOUS LOGGING FOR A MOBILE OPERATING ENVIRONMENT

(75) Inventors: Kenny Fok, Canada, CA (US); Eric Chi Chung Yip, San Diego, CA (US); Mikhail A. Lushin, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 377 days.

(21) Appl. No.: 11/970,253

(22) Filed: Jan. 7, 2008

(65) Prior Publication Data
US 2008/0294384 A1 Nov. 27, 2008

Related U.S. Application Data

(60) Provisional application No. 60/939,113, filed on May 21, 2007.

(51) Int. Cl.
*H04B 17/00* (2006.01)
*G06F 17/40* (2006.01)
(52) U.S. Cl. .............. 702/187; 702/179; 702/186; 702/188; 455/423; 455/67.11
(58) Field of Classification Search .............. 702/187, 702/179, 188, 186
See application file for complete search history.

(56) References Cited

U.S. PATENT DOCUMENTS

| | | | |
|---|---|---|---|
| 6,829,560 B2 | 12/2004 | Lehman | |
| 6,871,228 B2 | 3/2005 | Shah et al. | |
| 2002/0112047 A1 | 8/2002 | Kushwaha et al. | |
| 2005/0183143 A1 | 8/2005 | Anderholm et al. | |
| 2005/0276385 A1* | 12/2005 | McCormick et al. | 379/1.02 |
| 2006/0211415 A1* | 9/2006 | Cassett et al. | 455/423 |
| 2006/0217115 A1* | 9/2006 | Cassett et al. | 455/423 |
| 2006/0223495 A1* | 10/2006 | Cassett et al. | 455/405 |
| 2006/0234698 A1* | 10/2006 | Fok et al. | 455/425 |
| 2006/0258342 A1* | 11/2006 | Fok et al. | 455/414.1 |
| 2008/0052409 A1* | 2/2008 | Lazaridis et al. | 709/239 |
| 2008/0274716 A1* | 11/2008 | Fok et al. | 455/410 |

FOREIGN PATENT DOCUMENTS

| | | |
|---|---|---|
| EP | 1659753 A1 | 5/2006 |
| WO | WO8200376 A1 | 2/1982 |

OTHER PUBLICATIONS

International Search Report and Written Opinion - PCT/US2008/064434, International Search Authority - European Patent Office - Aug. 28, 2009.

* cited by examiner

*Primary Examiner*—Hal D Wachsman
(74) *Attorney, Agent, or Firm*—Darren M. Simon

(57) ABSTRACT

Providing for event-controlled continuous logging for a mobile operating environment is described herein. For instance, collection of mobile device operating system (OS) log data can be initiated and terminated as a result of one or more predetermined events. The events can both trigger collection as well as terminate collection of the log data. Further, limiting collection/termination of log data to particular log index codes is also described herein, enabling logging of data pertinent to one or more determinable events. As described, the subject specification discloses mechanisms to initiate and to terminate continuous logging of mobile OS log codes as a result of occurrence of one or more determinable events.

40 Claims, 11 Drawing Sheets

PROVIDING EVENT-CONTROLLED CONTINUOUS LOGGING FOR A MOBILE OPERATING ENVIRONMENT

CROSS REFERENCE TO RELATED APPLICATIONS

The present application for patent claims priority to Provisional Application No. 60/939,113 entitled METHODS AND APPARATUS FOR TRIGGERED CONTINUOUS LOGGING and filed May 21, 2007, assigned to the assignee hereof and hereby expressly incorporated by reference herein.

BACKGROUND

1. Field

The following relates generally to management of mobile operating systems, and more particularly to providing event-controlled continuous log triggers for a mobile operating environment.

2. Background

In recent years, a variety of advancements has occurred in cellular communication technology and cellular communication devices. Some of the advancements, such as integration of camera and video recording technology onto such devices, incorporation of e-mail and short messaging services into mobile communication, and the like, involve software and/or hardware applications. These applications have added increased flexibility, processing power, communication capabilities and so forth, to already popular communication devices (e.g., cellular telephones). As a result, such devices have become more popular in a consumer marketplace, motivating larger numbers of consumers to purchase such devices, or to upgrade to devices that include new applications and technologies.

Mobile device applications, processes, resources, and the like are executed by an operating system and such execution can be referenced for diagnostic purposes. For instance, actions taken by a processor pursuant to application instructions can be reported out by the processor as a log code, log instruction, or the like. A record of such log instructions can be useful to determine whether an application, resource or other component of a mobile operating system or mobile device is executing properly. For instance, log data pertinent to voice call initiation and setup can be utilized to determine frequency of call drops for a mobile device and reasons for occurrence of the call drops. As a number of applications, resources, functions and processes of modern mobile devices have increased, however, parsing log data has not only become increasingly important, but also increasingly complex and computationally prohibitive. As a result, mechanisms for parsing log data have and continue to be introduced in order to counter the increasing complexities that have recently been observed.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The subject disclosure provides event-controlled continuous logging for a mobile operating environment. For instance, collection of mobile device operating system (OS) log data (e.g., log codes, event codes, and/or request-response packets or the like of the mobile OS) can be initiated and terminated in response to occurrence of one or more predetermined events. In addition, the events can be associated with index codes configured to categorize mobile OS log data as a function of an application, process, resource function and/or the like of the mobile OS. Association of a start event with an index code(s) can limit collection of log data upon occurrence of the start event to that log data pertinent to the mobile OS application(s), process(es), resource(s), and/or function(s), associated with the index code(s). According to additional aspects, multiple events can be defined to trigger collection and multiple events can also be defined to terminate collection of log codes and/or request-response packets. Further, an event flag can be set to pair one or more initiating events with one or more terminating events. OS logic can be configured such that termination of collection (e.g., of all log data or log data pertinent to one or more index codes) is conditioned on occurrence of a terminating event that is paired with a corresponding initiating event by a common event flag value. As described, the subject specification discloses mechanisms to initiate and to terminate continuous logging of OS codes as a result of occurrence of one or more predetermined OS events.

According to some aspects, disclosed is a method of providing programmable event-controlled continuous code logging for a mobile device OS. The method can include establishing a first trigger that initiates collection of log data of a mobile OS and establishing a second trigger that terminates collection of the log data. In addition, the method can include conditioning execution of the first trigger and the second trigger on occurrence of a start event and a stop event, respectively, the start event and stop event are determinable by an application or process of the mobile OS.

In accordance with particular aspects, described is an apparatus that provides continuous event-controlled code logging for a mobile operating environment. The apparatus can include a logging module configured to collect log data in a mobile device OS and a management module configured to establish a first trigger that initiates collection of the log data and a second trigger that terminates collection of the log data. Furthermore, the apparatus can include a logic module that conditions execution of the first trigger on occurrence of a start event and execution of the second trigger on occurrence of a stop event, the start and stop event are determinable by an application or process of the mobile OS or a remote network component, or both.

According to still other aspects, disclosed is at least one processor configured to provide programmable event-controlled continuous code logging for a mobile device OS. The processor(s) can include a first module configured to establish a first trigger that initiates collection of log data of a mobile OS and a second module configured to establish a second trigger that terminates collection of the log data. The processor(s) can also include a third module configured to condition execution of the first trigger and the second trigger on occurrence of a start event and a stop event, respectively, the start event and stop event are determinable by an application or process of the mobile OS.

According to one or more additional aspects, an apparatus configured to provide programmable event-controlled continuous code logging for a mobile device OS is described. The apparatus can include means for establishing a first trigger that initiates collection of log data of a mobile OS and means for establishing a second trigger that terminates collection of the log data. Moreover, the apparatus can also include means for conditioning execution of the first trigger and the second trigger on occurrence of a start event and a stop event, respectively, the start event and stop event are determinable by an application or process of the mobile OS.

According to further aspects, described is a computer program product that includes a computer-readable medium containing instructions configured to provide programmable event-controlled continuous code logging for a mobile device OS. The instructions can include at least one instruction configured to cause a computer to establish a first trigger that initiates collection of log data of a mobile OS. The instructions can also include at least one instruction configured to cause a computer to establish a second trigger that terminates collection of the log data. Additionally, the instructions can include at least one instruction configured to cause a computer to condition execution of the first trigger and the second trigger on occurrence of a start event and a stop event, respectively, the start event and stop event are determinable by an application or process of the mobile OS.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
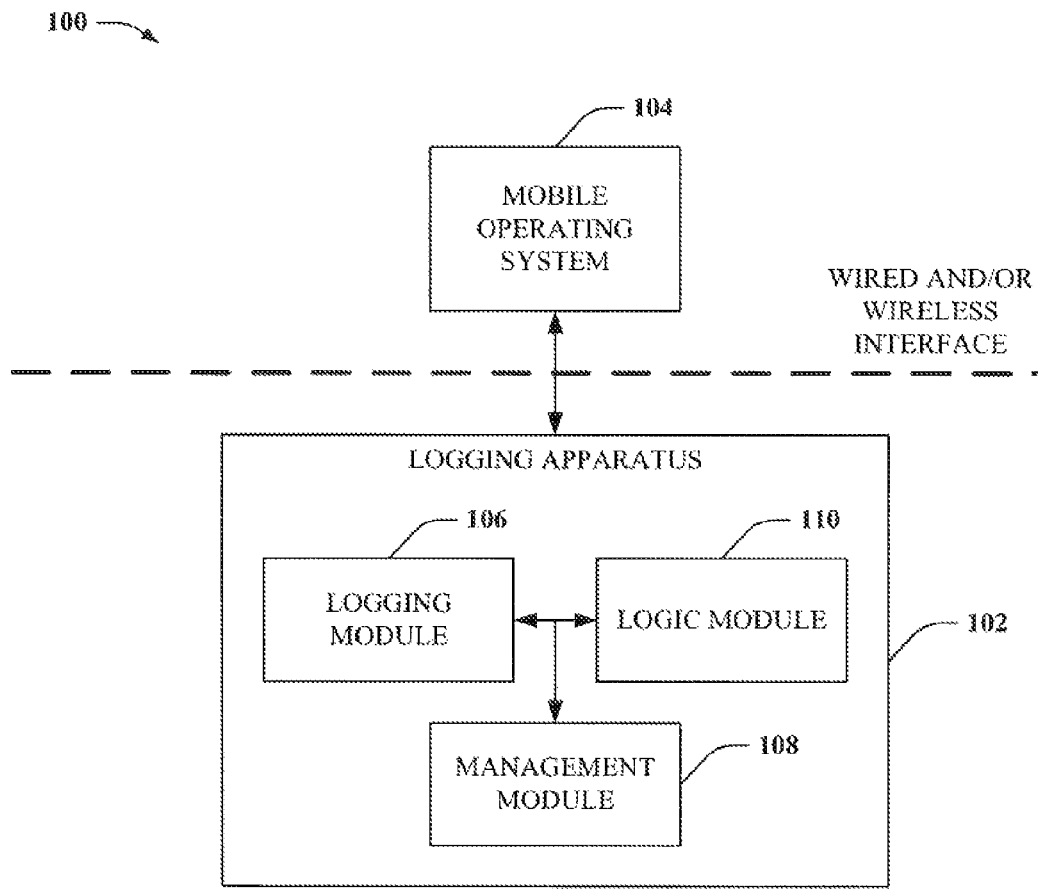
FIG. 1 depicts an example system that can initiate and terminate continuous mobile operating system (OS) logging based on occurrence of at least one event.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

The subject disclosure provides for event-controlled continuous logging of process information in a mobile operating system (OS). For instance, at least one start trigger can be established that initiates continuous logging of at least one log code, event data and/or request-response packet (hereinafter referred to as log data) for the mobile OS. Continuous logging is defined as perpetual collection of log data or specified portions of log data into memory (e.g., temporary memory, a paging file, a log file on a storage disc, or any suitable combination thereof or of like temporary or semi-permanent memory).

In addition, continuous logging can selectively choose log data from the mobile OS. For instance, a predetermined sampling function can be utilized to extract selective ones of the log data into a log file. The sampling function can include a parsing function that selects log codes based on an associated index code (see below). Further, the sampling function can include a timer that selects a log code during continuous collection at periodic or a-periodic intervals. As a further example, the sampling function can include a suitable combination of the previous selection mechanisms.

Log data or portions of log data can be extracted from mobile OS source code and processes of such source code, or can be provided to a logging module by the mobile OS source code, or both. Continuous logging, initiated by a start trigger, can persist indefinitely until one or more stop triggers (see below) are executed or the mobile device is powered down (although logging can optionally continue automatically on start-up if power down is not established as a stop trigger, defined below), or both, for instance. Alternatively, or in addition, at least one stop trigger can be established that terminates collection of mobile OS log data. For example, upon powering up a mobile device, collection of log data involved in mobile OS applications (e.g., communicating with a mobile network, establishing handshake data with such network, initiating location services, etc.) can be triggered and maintained continuously, until the device is powered down or until a stop trigger is executed. Optionally, a start trigger and a stop trigger can be specified in a manner such that either the stop trigger or the start trigger includes a non-hardware power-up or non-hardware power-down operation (e.g., a user pressing a power off or power on button).

In addition to the foregoing, execution of the start trigger and the stop trigger can be correlated to occurrence of one or more events determinable by the mobile OS. An event can be related to an application, function, process, or resource of a mobile device and/or a mobile network, or a received/provided user input/output, or a combination thereof or of like operations in a mobile environment.

In at least one example embodiment, events can typically be organized into at least three classifications, software driven events, hardware driven events, and combination software/hardware driven events. A software driven event can include execution of a module, process, function or the like of the mobile OE. An example can include establishing a handshake between the mobile device and a mobile communication network. A further example of a software event can include accessing a packet data protocol (PDP) context at the mobile device or at a mobile network interfaced with the mobile device in order to establish a data session (e.g., a web browsing session, and so on).

A combination software/hardware event can include a software response to a user input, or a user prompt and corresponding user input, for instance. As a particular example, a software/hardware event can be establishing a voice call session based on press of a 'call' button associated with a phone number on a cellular telephone. A hardware driven event can include user input on a user interface of the mobile device utilizing at least a hardware input (e.g., press of a button on the mobile device). As a particular example, a hardware event can include a press of a 'power on' button to power up the mobile device. In general, such events can be paired with start and stop triggers and utilized to initiate and terminate collection of mobile OS log data.

According to additional aspects, subsequent occurrences of an event can execute a start trigger and a stop trigger. For instance, initiation of a first voice call can be a start event that triggers collection of data, and initiation of a second voice call can be a stop event that triggers termination of data collection. In addition, the subject disclosure can provide for multiple start events and stop events that can execute a start trigger and stop trigger, respectively. According to such embodiments, upon occurrence of a start event a correlated start trigger can check to see if log data is already being collected (or a specified portion of the log data), and initiate collection of the log data (or specified portion) if not. Execution of one of the stop triggers (based on occurrence of a stop event) can then terminate collection of the log data (or the specified portion, if such portion is associated with the stop trigger). In addition to the foregoing, a reference counter can optionally be utilized to track a number of start events and stop events that have occurred, and once collection of log data has begun, condition termination of the log data upon occurrence of at least as many stop events as start events. In such a manner, distinct processes having separate start and stop events can continue to have log data collected even if a stop event associated with a separate process occurs. As a result, the subject disclosure can accommodate collection of log data for independent events and processes.

As a specific non-limiting example of the foregoing, collection of log data can be desired when a voice call is being conducted and also when an incoming call is received. In such a case, initiating a voice call and receiving an incoming call are both start events that execute the start trigger. Likewise, ending the voice call and ending the incoming call can both be stop events that execute the stop trigger. If a mobile device user initiates a voice call, subsequently receives an incoming call on a call waiting line, and then ends the voice call to take only the incoming call, the stop trigger will be executed (e.g., due to ending the voice call). Consequently, collection of log data is terminated even though the incoming call is still in progress. According to the above aspect, however, execution of the stop trigger can be conditioned on occurrence of an equivalent number of stop events as start events. Therefore, in the foregoing scenario, the stop trigger will not be executed until a second stop event occurs, and log data will still be collected until the received call is ended, for instance.

Also disclosed is utilization of one or more index codes to distinguish between various portions of log data. One or more such index codes can be associated with start events and/or stop events, and can restrict log data collection or termination to portions of the log data associated with the index code. The index code can be associated with and act as an identifier for log data pertinent to any suitable application, resource, function, or process of a mobile OS. (E.g., an index code can identify a particular log code, a particular event, or a particular request-response packet, or a combination of these or like portions of the log data). As a particular example, one or more index codes can be associated with global position system (GPS) information (e.g., contemporaneous location of a mobile device), and can be utilized to distinguish GPS-related log data from other log data. Such an index code, if associated with a start event/trigger, could limit collection of log data to just GPS log data. Alternatively, or in addition, associating such a GPS index code with a stop event/trigger could limit termination of collection of log data to GPS log data. According to some aspects, multiple index codes can be associated with a start event or stop event, or both. Thus, occurrence of a voice call could trigger collection of log data pertinent to GPS-related information, voice decoder-related information, and so on, or any other suitable log data associated with an index code that is paired with the voice call event.

According to additional aspects, the subject innovation can track occurrence of start events and stop events as a function of index code. As a result, termination of index-related log data collection can be conditioned on occurrence of at least as many stop events associated with an index code as start events associated with the index code. Consequently, index-related logging can be independent of a particular event that initiates the logging, as suitable.

According to one or more additional aspects, an event flag can be utilized to correlate one or more of multiple start triggers with one or more of multiple stop triggers. A start trigger/stop trigger having a common value for an associated event flag can be paired. As a result, a stop trigger can be limited to terminating collection of log data initiated by a paired start trigger. Log data triggered by a start trigger with a different event flag value will not be terminated by the stop trigger. Accordingly, a first trigger can initiate collection of log data without such data being terminated by an unrelated stop trigger.

In addition to the foregoing, the subject disclosure can incorporate a continuous logging trigger that logs data independently of start or stop events. The continuous logging trigger can be initiated by a special code on the mobile OE; once such trigger is initiated, log data will be perpetually recorded until a correlated continuous log stop trigger is executed. Other start triggers and stop triggers can optionally be suspended while continuous logging is engaged (e.g., if the continuous logging trigger is independent of index code and collects all log data of the mobile operating system). Further, a particular sample rate (e.g., that collects a log event once for a particular time period, such as a millisecond, microsecond, etc.) can optionally be associated with continuous logging. Additionally, the sample rate can optionally be different for event-triggered data collection as compared with the continuous trigger data collection. Specifically, a first collection sample rate can be established for logging initiated by the continuous trigger and a different (or, e.g., an identical) sample rate can be established for logging that is initiated by an event trigger.

Various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of one or more mobile applications operating on at least one mobile device and establishing secure communication between such applications. One skilled in the art should appreciate that similar techniques could apply to other communication environments as well.

As used in this disclosure, the terms "component," "system," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Further, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described herein.

Furthermore, various aspects are described herein in connection with a mobile communication device (or, e.g., a mobile device). A mobile communication device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine readable medium and/or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, a block diagram of an example system 100 is depicted that can provide event-controlled continuous data logging for a mobile operating system (OS) 104, according to aspects disclosed herein. A logging apparatus 102 can establish events that initiate and terminate continuous collection of log data (e.g., log codes, events and/or request-response data packets) for the mobile OS 104. The logging apparatus 102 and mobile OS 104 can be linked by a wired and/or wireless interface. For instance, the mobile OS 104 and logging apparatus 102 can be proximate a single mobile device, wherein the interface can be any suitable communication bus structure of such device. Alternatively, the logging apparatus can reside partly or wholly at a remote entity (e.g., a component of a mobile network such as a radio network controller [RNC], or the like). The interface between the mobile OS 104 and the logging apparatus could thus also be a wireless coupling (e.g., by way of a radio frequency [RF] connection between the mobile device and a base station), or a wired and wireless coupling (e.g., wireless connection between mobile device and base station in conjunction with a wired interface between the base station and an RNC). Accordingly, logging apparatus 102 can be implemented on a mobile device or on a network, which facilitates remote communication for one or more mobile and/or stationary devices.

Logging apparatus 102 can include a logging module 106 that is configured to collect log data in a mobile device OS (104). The log data can be related to processor-executed instructions, reading/writing data in memory, receiving/transmitting system (104) configuration data, or the like, or any suitable combination thereof. Log data can include position information taken by a GPS component (not depicted) of a mobile OS 104, data pertinent to setup or teardown of a voice call at a mobile network, execution record(s) associated with a web browsing resource (e.g., PDP context), or any suitable combination thereof or of other log data, as known in the art or made known to one of skill in the art by way of the context provided herein.

Logging apparatus 102 can further include a management module 108 that establishes a start trigger(s) or a stop trigger(s), or both, for initiation and termination, respectively, of collection of log data by the logging module 106. More specifically, management module 108 can be configured to establish a first trigger (e.g., a start trigger) that initiates continuous collection of log data (e.g., by the logging module) and a second trigger (e.g., a stop trigger) that terminates collection of the log data. Management module 108 can also establish multiple start and stop triggers to initiate/terminate collection of log data, as described infra.

In addition to the foregoing, logging apparatus 102 can further include a logic module that can condition execution of the first trigger on occurrence of a start event and/or condition execution of the second trigger on occurrence of a stop event. The start and stop events can be any suitable circumstance associated with an application, function, resource or process, or a combination thereof, of the mobile OS 104. Such start and stop events are determinable by an application or process of the mobile OS 104 or of a remote network component (not depicted) coupled with a mobile device upon which the mobile OS 104 resides. Examples of suitable start or stop events can include initiation/termination of a voice call, web browser, ring-tone, incoming call, short message service (SMS) message, instant message (IM), or activation of a PDP context or any other suitable resource of a mobile network or mobile device, and so on.

As described, system 100 enables either persistent collection of log data based on occurrence of a defined start event or termination of collection of log data based on an occurrence of a defined stop event, or both. Accordingly, system 100 can provide very flexible configurations for persistent collection of log data. Any detectable occurrence can be identified as a start and/or stop event and utilized to trigger collection/termination of collection of log data. As will be discussed in more detail, below, categorized log data collection can be implemented to provide added collection efficiency and preserve device power (e.g., by collecting only log data pertinent to an index code). Additionally, logic can be implemented that associates one or more start events and/or codes with one or more stop events and/or codes. Accordingly, initiation of collection and termination of collection can be index code specific and/or event specific as well, such that multiple start/stop triggers can function independently of other triggers to prevent premature log initiation/termination in a multi-trigger architecture.

Figure 2:
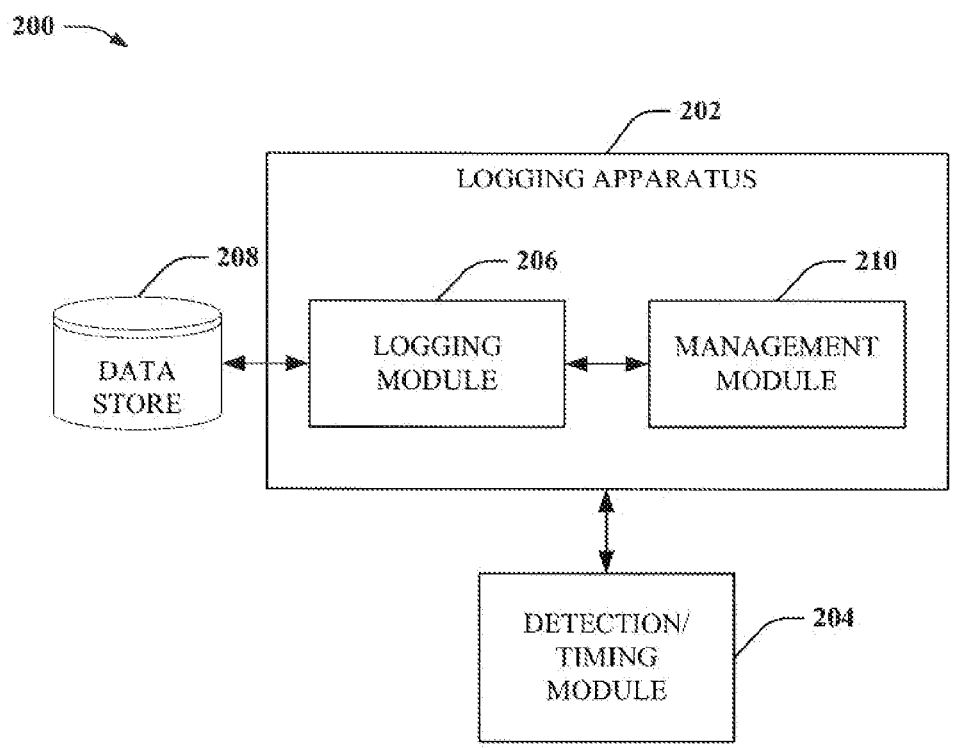
FIG. 2 illustrates a sample system that can detect occurrence of trigger events and record log initiation and termination times according to some aspects.

FIG. 2 illustrates a system 200 that can detect occurrence of trigger events and record log initiation and termination times according to some aspects of the disclosed subject matter. For instance, system 200 can couple a logging apparatus 202 (e.g., as described above with respect to FIG. 1, supra) with a detection and timing module 204. The logging apparatus can establish triggers that initiate and terminate collection of log data, and events that execute the triggers. The detection and timing module 204 can determine occurrence of such events and/or triggers, as described below, to facilitate logging mobile OS data. As described, system 200 can effect event-controlled data logging and provide start and stop times associated with collection of log data and termination of log data collection.

Logging apparatus 202 can establish a first trigger that initiates collection of log data upon occurrence of a first event (e.g., a start event, associated with the first trigger by management module 210) and a second trigger that terminates collection of the log data upon occurrence of a second event (e.g., a stop event, associated with the second trigger by management module 210). Occurrence of the first and second events can be determined by detection and timing module 204. For instance, the module 204 can monitor log information output by a mobile OS and identify portions of the information pertinent to predetermined events. The log information can be output, for instance, from execution of an application, resource, process, or function, or a combination thereof, associated with the events. As an example, if the first event is associated with access to a wireless application protocol (WAP) Internet browser, detection and timing module 204 can monitor log information pertinent to initiation and/or execution of the WAP browser to identify occurrence of the first event.

Collected log data can be stored in a data store 208 for reference, or can be transmitted to a diagnostic function of a mobile OS or a remote entity (e.g., a network controller). It will be appreciated that the data store 208 can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1408 of the subject systems and methods is intended to comprise, without being limited to, these and any other suitable types of memory.

In addition to the foregoing, detection and timing module 204 can record a start time (e.g., a time-stamp associated with collection of log data) when the start event occurs and/or the first trigger is executed, causing log data to be collected. The start time can be associated with the collected log data (e.g., in memory). Additionally, the detection and timing module 204 can record a stop time when the stop event occurs and/or the second trigger is executed due to occurrence of the stop event (or, e.g., due to occurrence of a number of stop events equal to a number of start events). Consequently, a time when log data is collected and when collection is terminated can be recorded and stored with collected log data, at the data store 208 for instance. Accordingly, diagnostic components (not depicted) can access the collected log information and obtain collection start and stop time and, by utilizing a sampling rate for instance, obtain approximate time for each log record (e.g., log code, event code, memory address, portion of data, request-response packet, or the like) included in the collected log information.

Figure 3:
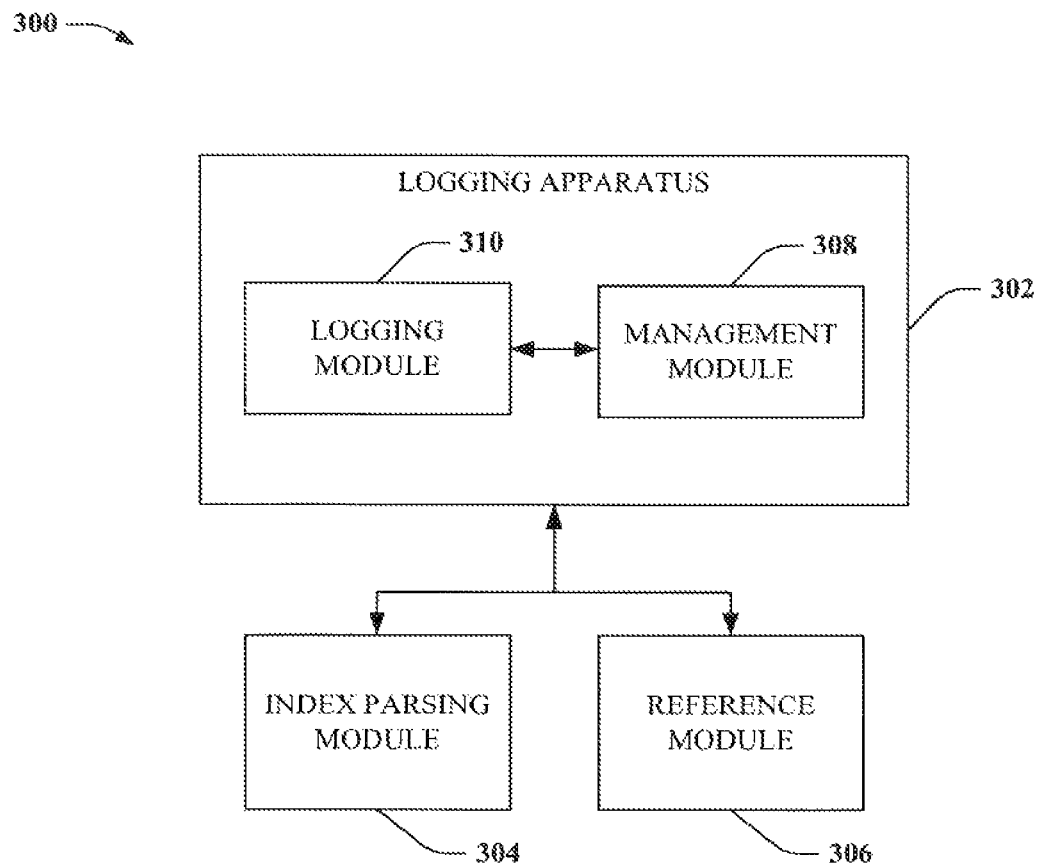
FIG. 3 depicts an example system that can log mobile OS data at least as a function of a system index according to additional aspects.

According to additional aspects, discussed in more detail infra, detection and timing module 204 can record time of initiation and termination as a function of index as well (see FIG. 3, infra). One or more index codes can be defined that categorize log data according to one or more applications, functions, processes, resources and/or the like of a mobile OS, device and/or mobile network. Each index code therefore can identify and distinguish data associated with at least one application/function/process/resource category associated with the index code. For instance, an index code can be established that categorizes log data associated with a GPS application (an application/resource of a mobile OS, device and/or network). Thus, if a start event associated with a GPS index code occurs and is detected by detection and timing module 204, collection of data pertinent only to the GPS application can be initiated. At such time, a GPS log data trigger time can be recorded and associated with a GPS log file saved at data store 208. If a stop event associated with the GPS index code subsequently occurs, detection and timing module 204 can determine such event and record a stop time for termination of collection of the GPS log data. Multiple start and stop events can occur (and, e.g., be determined and time-stamped by detection and timing module 204) independent of the collection of GPS-specific data (or, e.g., other index-specific data), as discussed in more detail infra.

FIG. 3 depicts a sample system 300 that can log instances of mobile operating system data at least as a function of system index. System 300 can include a logging apparatus 302 that can establish at least one first trigger for initiating collection of log data and at least one second trigger for terminating collection of the log data, as described herein. Further, each trigger can be executed upon occurrence of one or more predetermined events. In addition, logging apparatus 302 can keep track of a number of start events that initiate collection of data, and require an equivalent number of stop events occur at a given point in time in order to terminate the collection of data. Accordingly, system 300 can initiate data collection for multiple start events without the data collection being terminated prematurely by occurrence of a single stop event (or fewer number of stop events compared with start events).

System 300 can also include an index parsing module 304. Index parsing module 304 employs at least one index code, which categorizes log data of the mobile OS, to limit the collection of log data or the termination of log data collection, or both (e.g., by logging module 310), to such data pertinent to a particular index code and/or category associated with the index code. For instance, a first index code associated with voice call connectivity can limit collection of log data (and, e.g., termination of the collection of log data) to log data that is pertinent only to voice call connectivity. As a particular example, upon execution of an appropriate start trigger, voice call log information pertaining to call start and stop times, calls initiated at a device, calls received at a device, dropped calls and related times, un-connected calls, and so on, can be collected. It should be appreciated that an index code can be utilized to distinguish log data pertinent to any suitable application, process, function, or resource, or a combination thereof, of a mobile OS. Further examples of distinguishable log data can include GPS location information, network-based location information (e.g., including advanced forward link trilateration [AFLT], enhanced forward link trilateration [EFLT], enhanced observed time difference [EOTD], or the like), e-mail, SMS, IM, text message, voice over Internet protocol (VoIP), PDP context usage, or like mobile device or network application/process/resource/function information, or a combination thereof.

According to additional aspects of the subject disclosure, components of the logging apparatus 302 can facilitate and/or implement index based collection of log data. For instance, a management module 308 can be configured to associate at least one index code, which categorizes mobile OS log data as a function of an application, function, process, resource etc., of a mobile OS, device, and/or network, with a start event(s) or stop event(s). Consequently, upon occurrence of such an event(s), logging module 310 can collect/terminate collection of index-specific log data instead of all log data. As an example, an event can be associated with an index pertinent to the event (e.g., voice call log data pursuant to initiation of a voice call). Thus, upon occurrence of the event (e.g., voice call), only log data correlated to the index (e.g., voice call log data) defined as pertinent to the event in this case (e.g., at least by the association of the index code with the event, but which also can include inter-related processes, resources, and so on) will be collected/terminated. It should be appreciated that start/stop events and index codes need not be logically related by some function or application etc. of the mobile OS to be correlated as described herein. Rather, any suitable index code can be associated with any predetermined start or stop event to affect event-controlled index-specific logging as described herein. Further, as discussed at FIG. 2, supra, a start time associated with collection of the index-specific log data can be recorded as well as a stop time when collection is terminated.

In addition to the foregoing, system 300 can include a reference module 306 that tracks a number of index-specific start events that execute an index-specific start trigger. The reference module 306 can then condition execution of a second (e.g., stop) trigger on occurrence of a number of index-specific stop events equal to the number of index-specific start events. The second trigger can terminate execution only of the log data that is pertinent to the index code associated with the stop event(s).

The following non-limiting example can be illustrative of at least one benefit provided by reference module 306. Two index-specific start events, activation of a voice call and initiation of a GPS application at a mobile device, are associated with a GPS location index code, and both are set to execute a start trigger that can collect GPS-specific log data. Further, two index-specific stop events are defined, terminating the voice call and terminating the GPS application, that are also associated with the GPS location index code (e.g., that terminate collection of only GPS location index code log data). Typically, occurrence of either start event could trigger collection of GPS log data, and occurrence of either stop event could trigger termination of such collection if GPS log data collection is in process. However, it could be desired for collection of GPS log data to continue so long as either of the applications associated with the index-specific start events are active. As described, if both start events occur, initiation of the voice call and the GPS application, a single subsequent stop event, ending the voice call for instance, could trigger termination of GPS log data collection. As a result, desired log data would not be collected for the duration of the GPS application.

Reference module 306, however, can address the foregoing problem by conditioning termination of index-specific log data collection upon occurrence of at least an equivalent number of stop events as having a common (or, e.g., related) index code as start events that trigger collection. Accordingly, if both the voice call and GPS application are active concurrently (e.g., two GPS index start events), occurrence of two GPS index stop events could be required to terminate collection of the GPS log data. Specifically, within the constraints of this example, both the voice call and GPS application would need to be terminated (e.g., two GPS-specific stop events) for GPS log data collection to also be terminated. Therefore, reference module 306 can provide for collection of index-specific log data independent of a number of other events that initiated or could otherwise terminate such collection.

Figure 4:
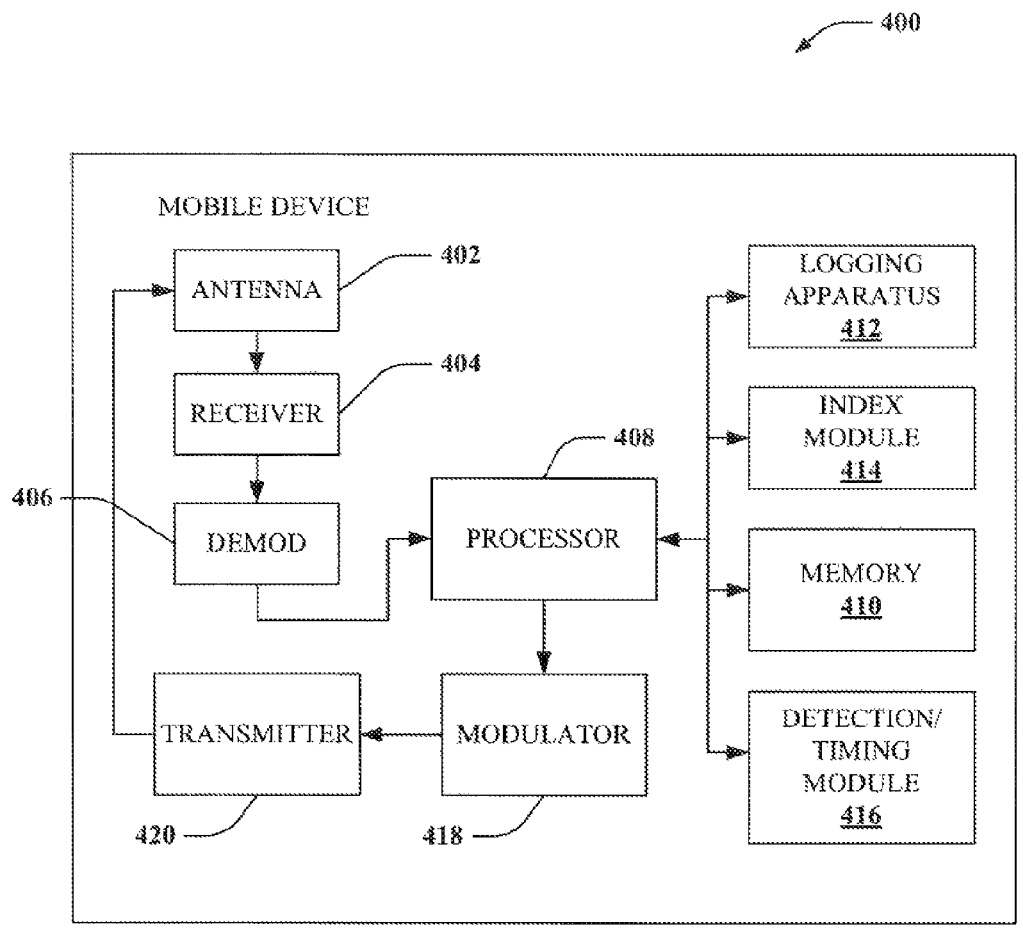
FIG. 4 depicts an example mobile device that provides event-controlled mobile logging for the mobile device OS according to further aspects.

FIG. 4 depicts an example mobile device 400 that provides event-controlled mobile logging for the mobile device operating system according to further aspects. The mobile device 400 can provide a mechanism for voice and/or data communication with remote devices (not depicted), and can further collect log data associated with operations of the device (400) based on occurrence of one or more events. Such events can be as described herein, and can include a request to collect log data (including, e.g., one or more index-specific sets of log data) received from a remote source (e.g., a diagnostic application executed at a network server). In addition, mobile device 400 can respond to a request for such data with collected log information. Accordingly, mobile device 400 can facilitate collection of log data for diagnostic, usage history, or like purposes.

Mobile device 400 includes at least one antenna 402 (e.g., a transmission receiver or group of such receivers comprising an input interface) that receives a signal (e.g., pertaining to voice call, data transfer, request for collection of diagnostic or usage history log information based start and stop trigger events, and so on) and a receiver 404, which performs typical actions (e.g., filters, amplifies, down-converts, etc.) on the received signal. Specifically, antenna 402 can receive a request to collect log data and/or index-specific log data based on occurrence of one or more collection trigger events. The request can also specify one or more termination events that can trigger termination of log collection, as described herein.

Antenna 402 and receiver 404 can also be coupled with a demodulator 406 that can demodulate received symbols and provide them to a processor 408 for evaluation. Processor 408 can analyze information received by antenna 902 or a user input interface of the mobile device (not depicted), and/or generate information for transmission by a transmitter 420. Additionally, processor 408 can control and/or reference one or more components (406, 410, 412, 414, 416, 418) of the mobile device 400. Additionally, processor 408 can execute one or more modules, applications, or the like (412, 414, 416) that provide event-controlled continuous logging of mobile OS log data, as described herein.

Mobile device 400 can additionally include memory 410 that is operatively coupled to processor 408 and that can store data to be transmitted, received, and the like. Memory 410 can store information related to a logging apparatus 412 for collecting mobile OS log data in response to event-based triggers. The logging apparatus 412 can assign one or more triggers to execute collection of log data, including index-specific log data, and one or more triggers to terminate log data collection, as described herein. The triggers can be associated with events that are predetermined by configurations at the mobile device 400, or provided by a received instruction (e.g., at antenna 402 and receiver 404) from a remote application. Further, logging apparatus 412 can store collected log data in memory 410 and provide the log data to a requesting application as suitable.

Memory 410 can also be coupled with an index module 414 that can associate one or more index codes with events that trigger collection and/or terminate collection of index-specific log data. The index codes, as described herein, can limit collection (or, e.g., termination of collection) of log data to log codes, event codes and/or request-response packets or the like pertinent to a particular index code (e.g., associated with a process, application, resource and/or function of the mobile device 400, or a mobile network or OS of such device). In addition, index module 414 can track a number of start triggers/events, as a function of index, and require an equivalent number of stop triggers/events, per index, occur prior to termination of index-specific log data.

Additionally, memory 410 can include a detection and timing module 416 that can detect occurrence of events (e.g., initiation of voice call, WAP browser, and so on) associated with a logging trigger utilized by logging apparatus 412. Events associated with a trigger, whether specified by a user of the mobile device 400, preconfigured in a mobile application of the device (400) or received from a remote device or network component (e.g., a mobile network RNC or the like), can be specified at the detection and timing module 416 for detection. Occurrence of such events can be determined and forwarded to logging apparatus 412 to initiate collection of data. Once a start event occurs (optionally as a function of index) a start time can be recorded. When a stop event (or sufficient number of stop events equivalent to start events) occurs that executes a stop trigger, a stop time can be recorded. Accordingly, mobile device 400 can record log information due to occurrence of determinable events, record start and stop times, and forward such information, as suitable, to requesting application, component or device. It will be appreciated that memory 410 can be either volatile memory or nonvolatile memory, or can include both volatile and nonvolatile memory, as described with respect to FIG. 2, supra.

Mobile device 400 still further comprises a modulator 418, and a transmitter 420 that transmits generated signals (e.g., by processor 408 and modulator 418) to, for instance, a base station, an access point, another access terminal, a remote agent, etc. Although depicted as being separate from the processor 408, it is to be appreciated that primary application 414 and/or second application 416 can be part of processor 408 or a number of processors (not shown).

Figure 5:
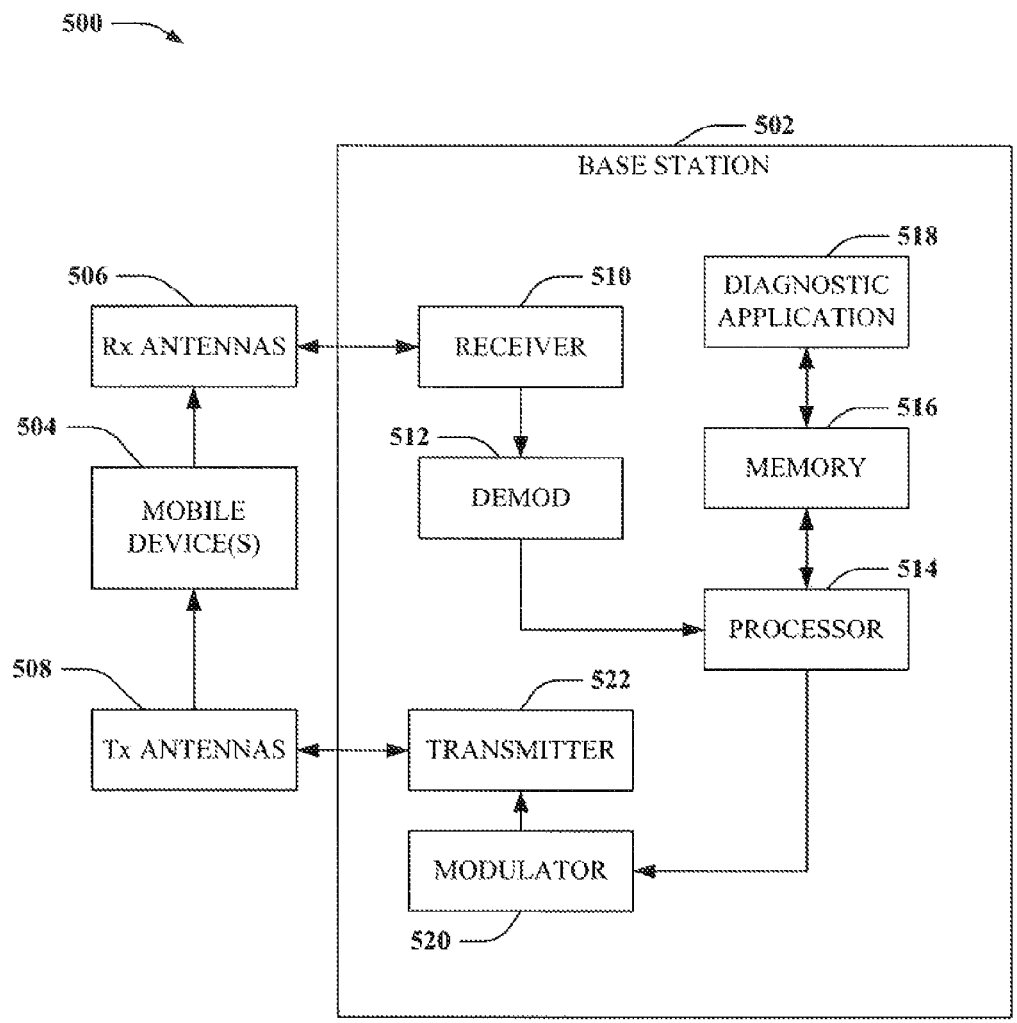
FIG. 5 illustrates an example base station that can facilitate, receive and/or consume event-controlled log data according to further aspects.

FIG. 5 illustrates an example system 500 including a base station 502 that can facilitate, provide configuration for, and/or receive and consume event-controlled log data for one or more mobile OSs (504). System 500 comprises a base station 502 (e.g., access point, . . . ) with a receiver 510 that receives signal(s) from one or more mobile devices 504 through a plurality of receive antennas 506, and a transmitter 522 that transmits to the one or more mobile devices 504 through a transmit antenna 508. Receiver 510 can receive information from receive antennas 506 and can further comprise a signal recipient (not shown) that receives requested log data from one or more mobile devices. Additionally, receiver 510 is operatively associated with a demodulator 512 that demodulates received information. A processor 514 can analyze demodulated symbols provided by demodulator 512 and can provide data to be transmitted first to a modulator 520 for symbol modulation and then to transmitter 522. The processor 514 further couples to a memory 516 that can store a diagnostic application 518 that facilitates and/or participates in secure remote communication as described herein.

For instance, diagnostic application 518 can be configured to perform diagnostic functions related to a mobile network, such as determining call drops, unavailable calls, lost calls, failed data network interfaces, and/or information pertaining to such circumstances or like circumstances, or combinations thereof. The diagnostic application 518 can send a query to one or more mobile devices 504 requesting log data from such devices. Further, the diagnostic application 518 can specify one or more events for triggering collection of log data, as described herein and/or one or more events for triggering termination of log data. The event(s) can include, e.g., an index code(s) that limits collection and/or termination of log data pertinent to the index code(s) or an event flag that pairs initiation and termination events, as described herein. Application 518 can further include rules for receiving and compiling received log data, consuming the log data in a diagnostic, management, and/or maintenance function of a network, and forwarding received and/or compiled information to a network service provider or a component thereof (e.g., a server, database, or the like of a network service provider), for instance. Consequently, application 518 can request and configure event-controlled collection of mobile device (504) log data, and/or any other suitable activity related to performing the various actions and functions set forth herein.

It should also be appreciated that diagnostic application 518 can reside wholly in memory 516 and/or processor 514. However, according to some embodiments the diagnostic application 518 can reside partially or completely separate from base station 502, and communicate with processor 514 and/or memory 516 via a remote network interface. For instance, the diagnostic application can reside proximate a radio network controller (RNC) of a mobile network that is communicatively coupled with the base station 502 by way of a wired and/or wireless data connection (e.g., transmission control protocol, Internet protocol [TCPIP] connection). Accordingly, the subject disclosure should not be limited such that the diagnostic application 518 or functions related to such application (518) as described herein are executed solely at base station 502.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 6:
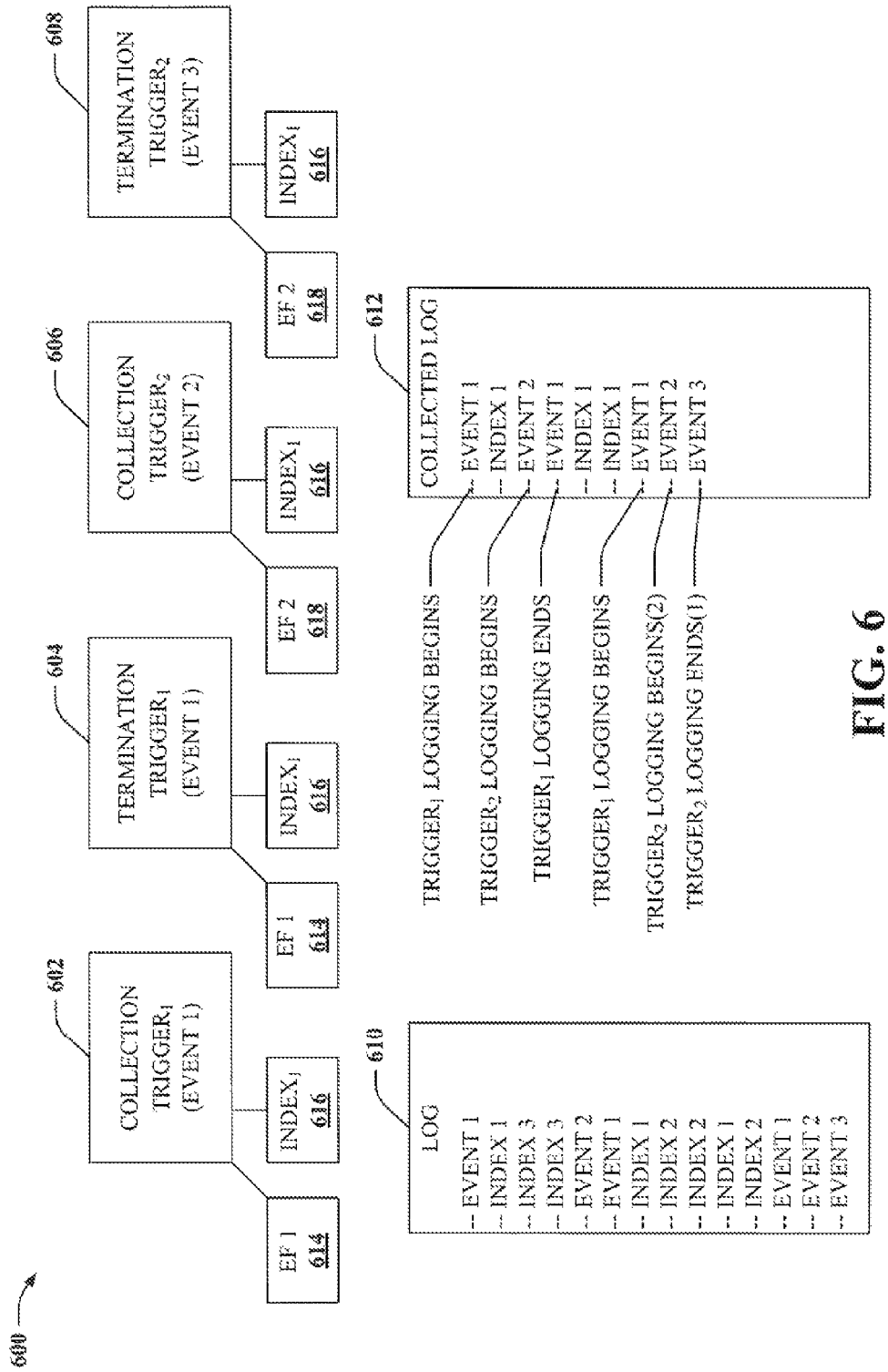
FIG. 6 depicts a sample logging event based on paired initiation and execution triggers according to additional aspects.

FIG. 6 is an illustration 600 of an example log 610 and collected log 612 for various paired trigger events (602, 604, 606, 608) according to one or more aspects of the subject disclosure. Triggers (602, 604, 606, 608) defined to initiate and/or terminate collection of log data 610 as described herein can further be correlated by an event flag (614, 618). An event flag (614, 618) can couple a start trigger (602, 606) with at least one of multiple stop triggers (604, 608). (E.g., the start trigger 602, 606 can initiate continuous collection of all log data 610 or a subset of the log data (610) identified by one or more index codes 616 associated with a start trigger(s) 602, 606, and the stop triggers 604, 608 can terminate collection of all log data 610, or a subset of the log data (610) identified by an index code(s) 616 associated with a stop trigger(s) 604, 608, as described herein.) Furthermore, event flags (614, 618) can facilitate conditioning termination of log data 610 on a start and stop trigger (602, 604, 606, 608) having a common event flag (614, 618). Particularly, execution of a stop trigger 604, 606 that terminates collection of log data 610 can be conditioned on such stop trigger 606, 610 having a common event flag value (614, 618) as a start trigger 602, 606 that initiated such collection. Stated differently, a stop trigger (604, 608) can be limited so that only data collection (612) initiated by a related start trigger (602, 606 respectively), (e.g., related by a common event flag value 614 or 618) is terminated by that stop trigger (604, 608).

As depicted by FIG. 6, each trigger (602, 604, 606, 608) is triggered by an event (e.g., event 1, event 2, or event 3, which can include any event as described herein) and is associated with an index code 616 and an event flag 614, 618. Particularly, collection trigger$_1$ 602 is executed upon occurrence of event 1 whereas collection trigger$_2$ 606 is initiated upon occurrence of event 2. Both collection triggers (602, 606) are associated with an index 1 index code 616 and therefore initiate collection of log data (610) associated with index$_1$ 612 only; other indexes (e.g., index 2, index 3 and so on) are ignored as a result of execution of these triggers (602, 606).

In addition to the foregoing, the collection triggers (602, 606) are also each associated with an event flag. Particularly, collection trigger$_1$ 602 is associated with event flag 1 610 whereas collection trigger$_2$ 606 is associated with event flag 2 618. The event flags 614, 618 can correlate the collection triggers (602, 606) with one or more termination triggers (604, 608) as discussed above. As depicted, termination trigger$_1$ 604 is associated with event flag 1 614, and consequently is correlated/paired with collection trigger$_1$ 602. Thus, upon execution of termination trigger$_1$ 604, collection of log data initiated by collection trigger$_1$ 602 can be terminated. Because termination trigger$_1$ 604 is also associated with index$_1$ 612, only data collection pertinent to index$_1$ 612 will be terminated. Thus, if another start trigger (602, 606) associated with index1 and index2 (e.g., by a suitable index code(s) 616) and having a common event flag as termination trigger$_1$ 604 is activated, then execution of termination trigger$_1$ 604 can stop collection of index 1 log data, but collection of index 2 log data can continue.

In a similar manner as described above with respect to termination trigger$_1$ 604, termination trigger$_2$ 608 is associated with an index code (616) and can also be associated with an event flag (event flag 2, 618). Consequently, termination trigger$_2$ 608 can stop collection of data pertinent to index 1 616 and that was initiated by a start trigger (606) also associated with event flag 2 618 (e.g., in this case collection trigger$_2$ 606). As indicated at 608, termination trigger$_2$ 608 is executed upon occurrence of event 3.

Log 610 provides a sequential indication of event occurrences, request-response packets and index-specific log codes related to processes of a mobile OS (not depicted). The event occurrences can be correlated to logging triggers (602, 604, 606, 608) as described herein to initiate and/or terminate collection of log data. For instance, the first line in Log 610 is occurrence of event 1. As a result, collection trigger$_1$ 602 can be initiated and thus data associated with index 1 can be saved to a collected log 612. According to further embodiments, events and/or request-response packets (not depicted) can also be included within collected log 612, independent of index-specific log codes. Thus, collected log 612 can also record occurrence of event 1 (and other events). Subsequently, index 1 log data appears in Log 610 and is collected at 612. Index 3 log data is not collected at collected log 612 because collection trigger$_1$ 602 is associated with index code 1 616, limiting collection of log data to index 1 data. Event 2 occurs and collection trigger$_2$ 606 can be executed. Collection trigger$_2$ 606 is also associated with index code 1 616, limiting collection of log data (612) to index 1 data and/or event data.

After event 2 occurs in Log 610, event 1 re-occurs. Re-occurrence of event 1 triggers termination trigger$_1$ 604 (e.g., because termination trigger$_1$ 604 is associated with event 1 and because collection trigger$_1$ 602 has already been executed), which can terminate collection of data associated with collection trigger$_1$ 602 and index code 1 616. However, because collection trigger$_2$ 606 has a different event flag (618) than termination trigger$_1$ 604, collection trigger$_2$ 606 still logs data associated with index 1. Thus, after the first occurrence of event 2 at Log 610, collection trigger$_2$ 606 still collects event 1 and index 1, skips index 2 twice, collects index 1 and skips index 2, at collected log 612. Occurrence of event 1 is then collected and re-executes collection trigger$_1$ 602. Occurrence of event 2 then initiates collection trigger$_2$ 606 (optionally initiating collection trigger$_2$ 606 a second time, which can be recorded by a reference module that conditions termination of data collected by multiple executions of collection trigger$_2$ 606 upon at least an equivalent number of correlated termination triggers). Occurrence of event 3 triggers termination trigger$_2$ 608, which can terminate collection of data associated with collection trigger$_2$ 606 (since collection trigger$_2$ 606 and termination trigger$_2$ 608 share a common event flag 618), or optionally can count toward a first of two executions of termination trigger$_2$ 608 required to terminate collection of data by collection trigger$_2$ 606, as described herein. To terminate data collection with respect to index 1 log codes, event 1 would need to re-occur to execute termination trigger$_1$ 604 a second time, and optionally event 3 could need to re-occur to terminate the $2^{nd}$ execution of collection trigger$_2$ 606, depending on whether a reference module tracks a number of consecutive collection trigger (602, 606) occurrences, for instance.

As an alternative example to the foregoing, start and stop triggers can be associated with difference index codes, and thus collect/terminate collection of different index-specific log codes, events and/or request-response packets. For instance, index codes (616) associated with collection trigger$_2$ 606 and termination trigger$_2$ 608 can specify index 2 log codes rather than index 1 log codes, as is depicted by FIG. 6. In such case, occurrence of event 2 can trigger collection of index 2 log codes instead of index 1 log codes. In addition, occurrence of event 3 can terminate collection of index 2 log codes (that were initiated by a collection trigger [606] correlated to EF 2 618). In such a manner, execution of the two termination triggers (604, 608) would not interfere with unpaired collection triggers (602, 606) regardless of event flags (614, 618), because such triggers are set to collect and terminate different sets of data. Specifically, in such case, collection trigger$_1$ 602 would initiate collection of index 1 log codes only, and termination trigger$_2$ 608 would terminate collection of index 2 log codes only (and vice versa with respect to collection trigger$_2$ 606 and termination trigger$_1$ 604). It should be appreciated that FIG. 6 provides but two examples of event-controlled data collection. Numerous other examples, not specifically articulated within the subject disclosure but that are made known to one of skill in the art by way of the context provided by the subject disclosure, are also contemplated and expressly incorporated herein. Accordingly, the claimed subject matter is not limited by the particular embodiments disclosed herein; such embodiments are intended only as illustration to provide clarity.

Referring to FIGS. 7-10, methodologies relating to providing event-controlled logging of mobile OS data and events are depicted. While, for purposes of simplicity of explanation, the methodologies are shown and described as a series of acts, it is to be understood and appreciated that the methodologies are not limited by the order of acts. For example, in accordance with one or more aspects, some acts can occur in different orders and/or concurrently with other acts from that shown and described herein. In addition, those skilled in the art will understand and appreciate that a methodology could alternatively be represented as a series of interrelated states or events, such as in a state diagram. Moreover, not all illustrated acts are necessarily required to implement a methodology in accordance with one or more aspects.

Figure 7:
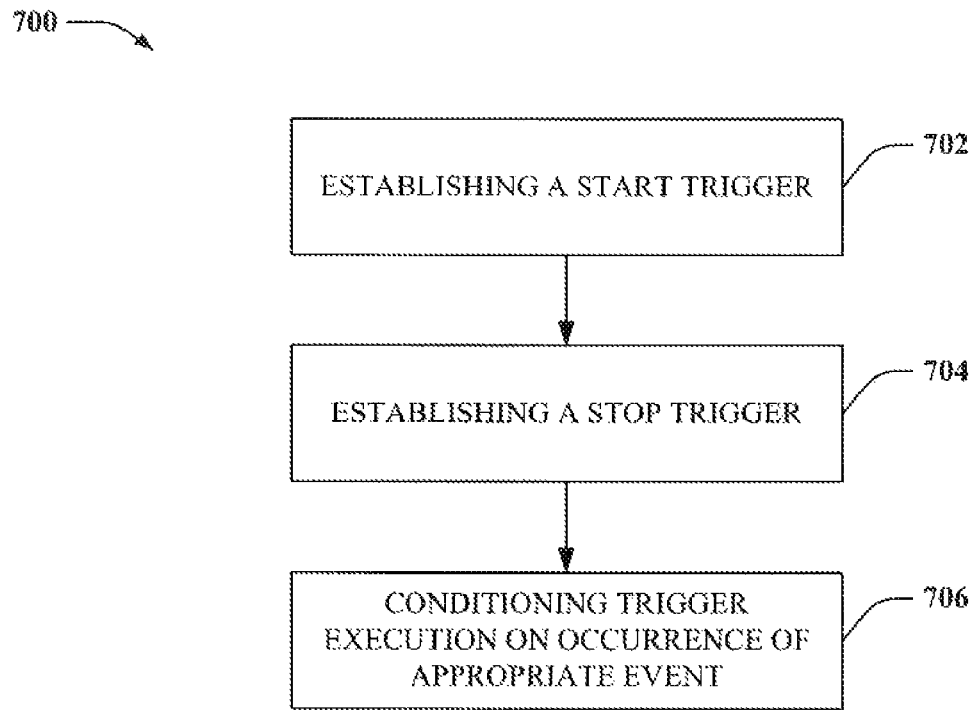
FIG. 7 illustrates a sample methodology for providing event-controlled logging in a mobile operating environment.

FIG. 7 depicts a sample methodology for providing event-controlled logging in a mobile operating environment. At 702, method 700 can establish a start trigger that initiates collection of log data in a mobile operating environment. The start trigger can be at least a hardware, software, and/or firmware implementation of electronic logic that associates collection of mobile operating environment data with a determinable event or events. Such data can include any suitable function or process of the mobile operating environment (e.g., conducting a voice call, conducting data exchange with a remote data network by way of a wired and/or wireless interface, conducting diagnostic, maintenance and/or management information pertaining to the foregoing or the like, and so on). Further, the determinable event can be any suitable event that can be detected and identified by a process of the mobile operating environment. Such events can include initiating or receiving a voice call, executing a mobile device application such as a ring-tone, downloading/installing a ring-tone application or other application, executing a WAP browser or the like, an address book, message history, e-mail or message (e.g., SMS, IM, text, or the like) application, accessing a mobile device and/or mobile network resource such as a PDP context for establishing a connection with a remote data network (e.g., the Internet), a vocoder for decoding/encoding audio information as voice encrypted data, or any suitable combination of the foregoing or of the like.

At 704, method 700 can establish a stop trigger that can terminate collection of log data. For instance, the stop trigger can terminate the collection of log data initiated by execution of the start trigger, discussed above. Further, the stop trigger can also be at least a hardware, software and/or firmware implementation of electronic logic that associates terminating log data collection (once initiated by the start trigger) with occurrence of a determinable event or events. The event(s) can be a subsequent occurrence of an event utilized by the start trigger, or can be an occurrence of an event unrelated to the start trigger. Upon initiation of the stop trigger, collection of log data is stopped.

According to particular embodiments, log collection start time(s) and stop time(s) (corresponding to execution of a start trigger and stop trigger, respectively) can be recorded and included within a collected log data file. According to further embodiments, multiple executions of the start trigger can require at least an equivalent number of stop trigger executions for termination of the log data. Accordingly, multiple start events can trigger collection of log data without a single stop event terminating the collection of data.

At 706, method 700 can condition execution of the start trigger and stop trigger on occurrence of at least one determinable event correlated to such triggers. The event(s) can be subsequent occurrences of a single event or different events, or a combination of both. Accordingly, occurrence of an event(s) correlated with a trigger can either execute the start trigger to initiate collection of log data (e.g., all log data or event-only data, or data associated with a particular identifier such as an index code, and so on) or execute the stop trigger to terminate collection of the log data. Method 700 therefore, provides a continuous logging of mobile environment log data or request-response packets that can at least be terminated by a determinable event, or can both be initiated and terminated by one or more determinable events.

Figure 8:
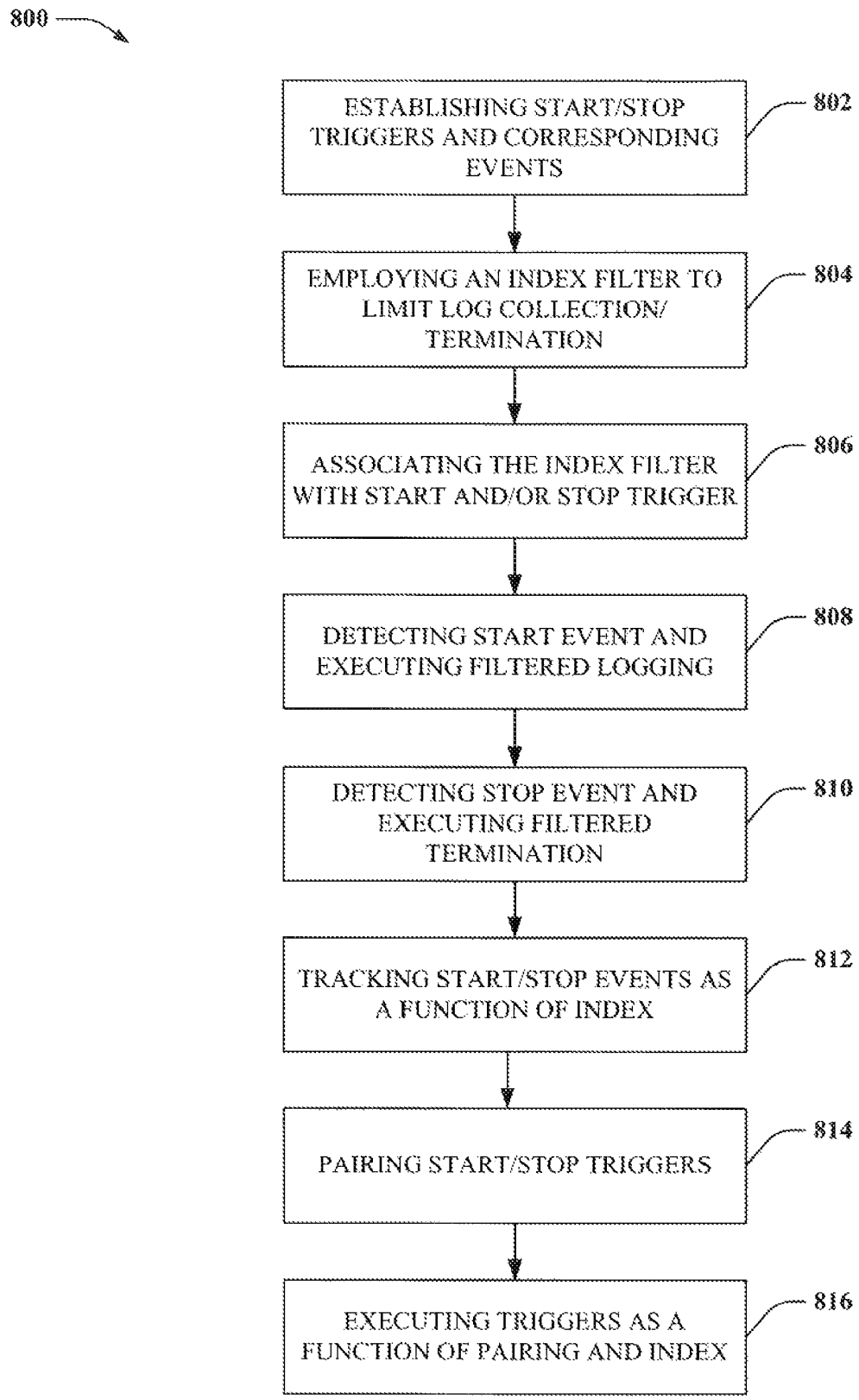
FIG. 8 depicts an example methodology for providing index specific logging and/or paired start/stop events according to one or more aspects.

FIG. 8 depicts an example methodology for providing index-specific logging and paired start/stop events according to one or more aspects. Method 800, at 802, can establish at least one start trigger and at least one stop trigger for collection/termination of mobile environment log data, as well as determinable events that execute the triggers, as described herein. At 804, method 800 can employ at least one index code to limit collection and/or termination of log data to that log data pertinent to the particular index code. The index code can represent log data associated with any suitable application, process, function, or resource, or a combination thereof or of the like, of a mobile operating system or mobile network (examples described elsewhere herein could be applicable to the index code(s) employed at reference number 804). At 806, the at least one index code can be associated with the start and/or stop trigger, or a combination of any of multiple start and/or stop triggers. Such association can cause data collected by a start trigger to include only log data (e.g., log codes, events, and/or request-response packets) pertinent to the specified index code(s). Alternatively, the association can cause data collection by a stop trigger to be limited to only data pertinent to the index code(s), allowing other data collection to continue.

At 808, method 800 can detect a start event and execute index-specific logging. The start event can be any suitable event determinable by a mobile operating system and associated with a start trigger(s) and index code(s). At 810, method 800 can detect occurrence of a stop event and execute an associated stop trigger that terminates collection of log data associated with a particular index code, as described herein. At 812, start and/or stop events can be tracked as a function of index code associated with such events or associated with a trigger(s) correlated to such events. For instance, if two start events associated with a first index code (e.g., related to GPS applications) occur, method 800 can track such occurrence. Additionally, method 800 can condition termination of data collected because of such start events on occurrence of at least an equivalent number of stop events also associated with the first index code. Accordingly, log data pertinent to the GPS applications will be collected until two appropriate stop triggers, specifying termination f GPS applications (e.g., by association with the first index code) occur.

In addition to the foregoing, method 800, at 814, can pair start and stop triggers. Each pair of triggers can condition termination of log data collection by occurrence of a stop trigger and/or event on prior execution of a paired start trigger. For instance, a stop trigger can be limited to terminating collection of data that was initiated by a start trigger paired with the stop trigger. The pairing can be accomplished, for instance, by setting a data flag associated with the start and stop triggers to a common value. If a stop trigger is executed prior to execution of a paired start trigger, as described, any concurrent collection of log data is left unaffected by execution of the stop trigger.

At 816, stop and start triggers can be executed as a function of both trigger pairing and index code. Specifically, a start trigger can initiate collection of data pertinent to a particular index code of the mobile OS, where such collection of data is only terminated by a stop trigger that is both paired with the start trigger and that is associated with the index code. If multiple index codes are associated with the start trigger, then index-specific log data collection (e.g., collection of codes, events and/or packets pertinent to the index code) can be terminated by a stop trigger that is paired with the start trigger and is associated with at least one common index code as the start trigger. As described, method 800 provides for employing index-specific logging of mobile OS log data, and for pairing start and stop triggers to limit termination of data log collection to paired triggers and events. Accordingly, method 800 provides for flexible event controlled mobile OS data logging, as described herein.

Figure 9:
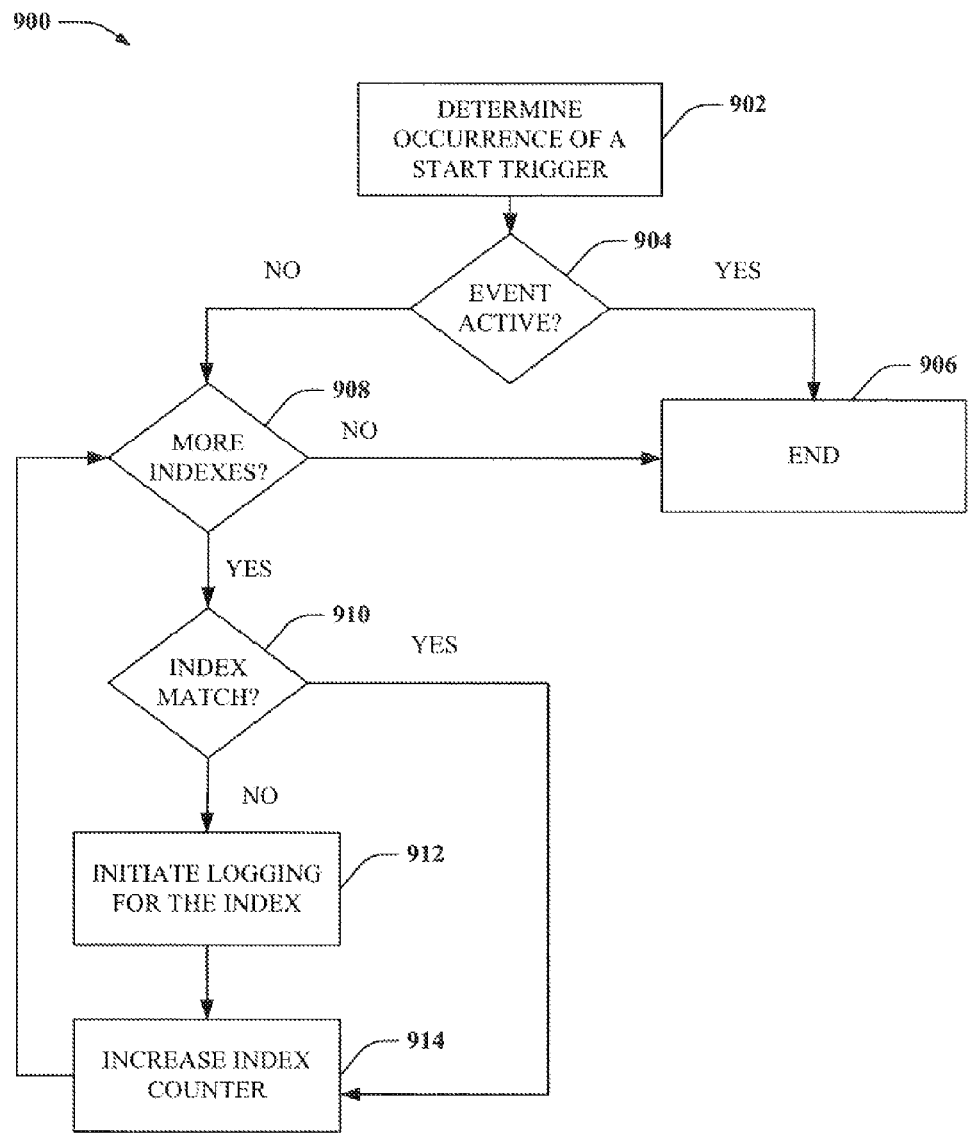
FIG. 9 depicts an example methodology for executing a start trigger based on occurrence of a start event with index code(s).

FIG. 9 depicts an example methodology 900 for executing a start trigger based on occurrence of a start event associated with one or more index code(s). At 902, method 900 can determine occurrence of a start trigger, as described herein. At 904, method 900 can determine whether data collection associated with the start trigger is already active; if data collection is active, method 900 can proceed to 906 where the method is ended. If log data collection specified by the start trigger at reference number 902 is not yet active, method 900 proceeds to 908.

At 908, a determination is made as to whether an index code is associated with the start trigger. If no index code is associated with the start trigger method 900 can end at 906. If, at 908, an index code associated with the start trigger is identified (e.g., a first index code), method 900 can proceed to 910 where a determination is made as to whether the index code matches a concurrent collection of log data. Said differently, at reference number 910 a determination is made as to whether log data pertinent to the particular index code is already being collected. If so, method 900 proceeds to 914 to increase an index counter associated with the particular index code can be incremented by one. If log data associated with the particular index code is not concurrently being collected, method 900 can proceed to 912.

At 912, method 900 can initiate logging for the particular index. Accordingly, log data associated with a category of mobile OS data pertinent to the index code is continuously collected in a log file. The log data will continue to be collected until the mobile device is powered off, or until a predetermined event associated with a stop trigger occurs (e.g., where such stop trigger terminates collection of data particular to the index code, see FIG. 10, infra). Method 900 thereafter proceeds to 914, where an index counter associated with the particular index code can be incremented by one (e.g., to identify a number of start triggers associated with the index code that have been executed). Subsequently, method 900 can proceed to 908 to determine whether more indexes are associated with the start trigger, and if not, end at 906.

Figure 10:
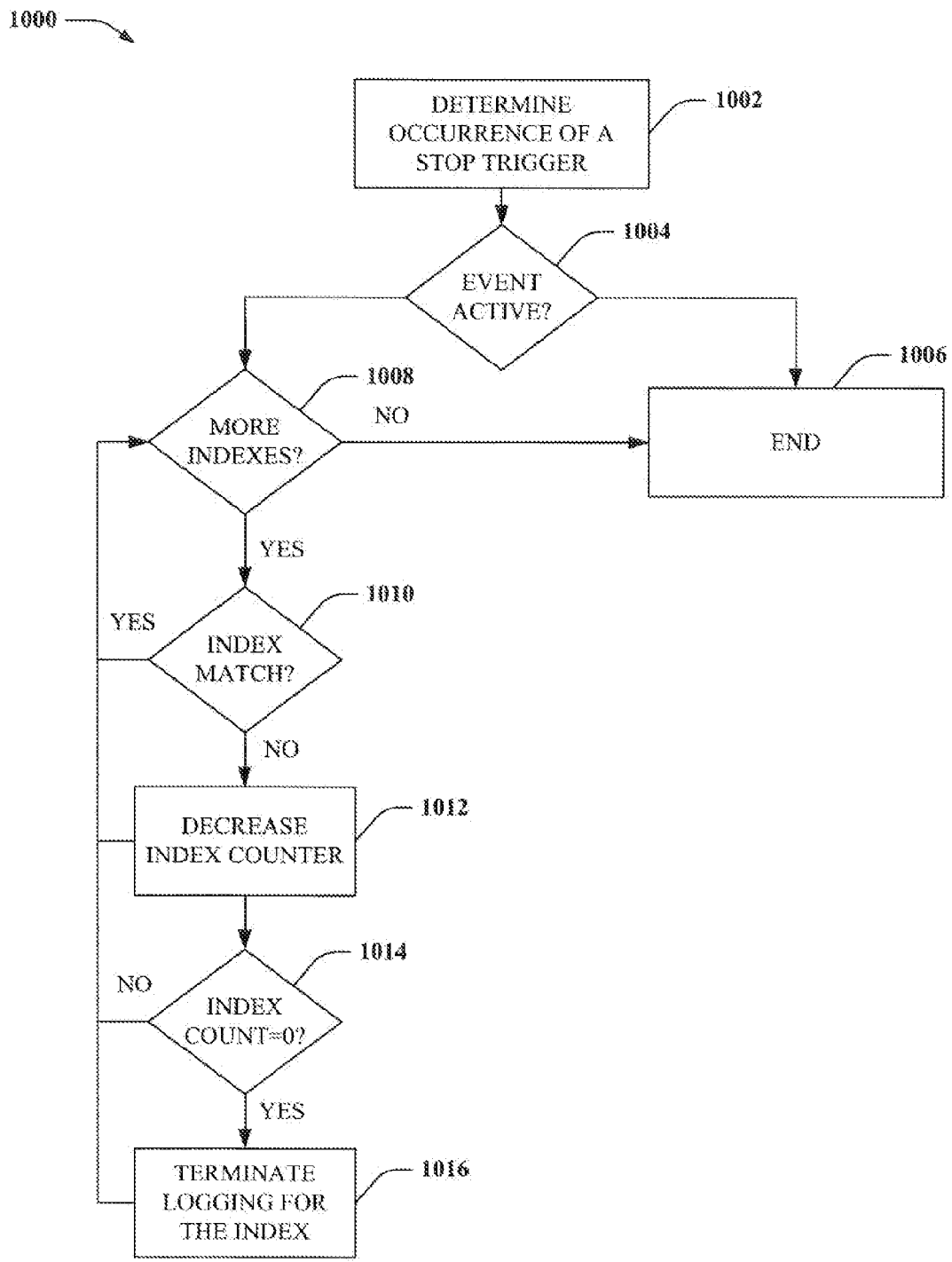
FIG. 10 illustrates an example methodology for executing a stop trigger based on occurrence of a stop event with index code(s).

FIG. 10 illustrates an example methodology 1000 for executing a stop trigger based on occurrence of a stop event associated with at least one index code(s). At 1002 an occurrence of a stop trigger can be determined. At 1004, a determination is made as to whether data collection associated with one or more index codes associated with the stop trigger are active. If no data collection pertinent to such index codes is active, method 1000 can proceed to 1006 and end. If data collection pertinent to at least one such index code is active, method 100 can proceed from 1004 to 1008.

At 1008, a determination is made as to whether an index code(s) associated with the stop trigger is un-processed. If such index code(s) has been processed by method 1000, the method 1000 can end at 1006. If more indexes remain, method 1000 proceeds to 1010. At 1010, an un-processed index code associated with the stop trigger is selected and a determination is made as to whether the unprocessed index code matches any concurrent index-specific data log collection. If not, method 1000 can return to 1008 to determine whether additional un-processed index codes are associated with the stop trigger. If, at reference number 1010, an index code matches a concurrent collection of log data, method 1000 proceeds to 1012 where an index counter associated with the index code is decremented. At 1014, a determination is made as to whether the index counter associated with the index code is equal to zero after being decremented at 1012, if so method 1000 proceeds to 1016 where data collection pertinent to the index code is terminated. If, at reference number 1014, the index counter is not equal to zero after being decremented, method 1000 can proceed to 1008 and proceed as described above. Accordingly, method 1000 provides for detecting occurrence of a stop trigger and associated index code(s), tracking a number of active index codes, and terminating collection of log data associated with the index code(s) if no active index codes remain.

Figure 11:
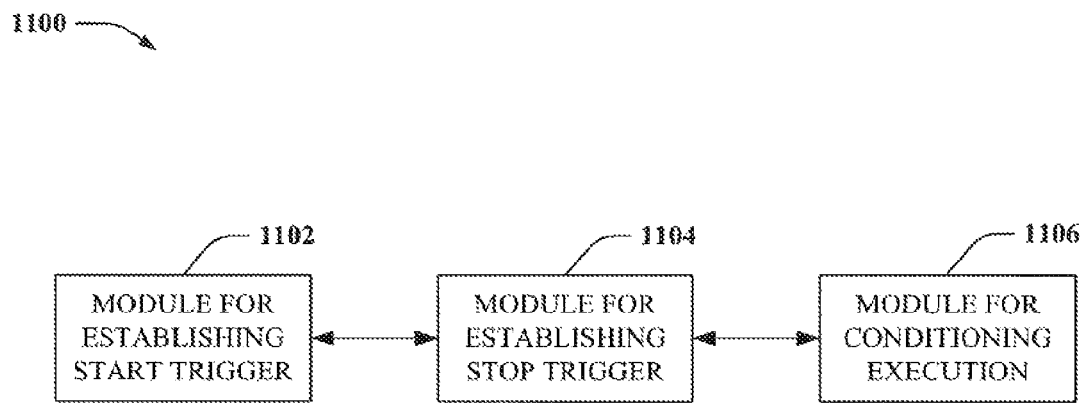
FIG. 11 depicts a sample system that can provide and/or facilitate and consume event-controlled logging and log information in a mobile operating environment according to at least one aspect.

FIG. 11 illustrates a sample system 1100 that can provide event-controlled logging in a mobile operating environment according to one or more aspects of the subject disclosure. System 1100 can include at least a module for establishing a start trigger 1102 for a mobile OS logging system. The start trigger can initiate collection of mobile OS log data. Also included is a module for establishing a stop trigger 1104 for the mobile OS logging system. The stop trigger can terminate collection of the log data initiated by the start trigger. According to further aspects, system 1100 can also include a module for conditioning trigger execution 1106. Specifically, the module 1106 can condition execution of the start trigger and the stop trigger on occurrence of a start event and a stop event, respectively. The start event and stop event can be any suitable determinable process or application of the mobile OS. The events and/or triggers can be associated with one or more index codes that limit collection and/or termination of the log data to that log data of the mobile OS pertinent to an index code of an application, function, process, or resource, or a combination thereof, of the mobile OS or a mobile network. Further, multiple start and stop triggers can be established by the modules 1102, 1104 and can include an event flag. Common event flag values can pair a start trigger(s) with a stop trigger(s), such that execution of a stop trigger only terminates collection of data initiated by a paired start trigger (and, e.g., having a common index code). Accordingly, system 1100 provides a flexible mechanism to control collection of log data based on determinable events associated with a mobile OS and/or a mobile network.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of providing programmable event-controlled continuous code logging for a mobile device operating system (OS), comprising:
   establishing a first trigger that initiates continuous collection of log data of a mobile OS;
   establishing a second trigger that terminates collection of the log data;
   conditioning execution of the first trigger and the second trigger on occurrence of a start event and a stop event, respectively, wherein at least one of the start event or the stop event is associated with a non-hardware start-up or a non-hardware shut down operation of a mobile device, and wherein the start event and stop event are determinable by an application or process of the mobile OS; and
   providing a second application or process with access to selected ones of the continuously collected log data, selected based on a sampling function.

2. The method of claim 1, further comprising at least one of:
   detecting occurrence of the start event, executing the first trigger and recording a log collection start time; or
   detecting occurrence of the stop event, executing the second trigger if collection of the log data has begun and recording a stop time associated with execution of the second trigger.

3. The method of claim 1, further comprising limiting the collection or the termination of the collection, or both, to log data that is pertinent to an index code of the mobile OS, wherein the index code categorizes mobile OS log data.

4. The method of claim 3, further comprising at least one of:
   associating the index code with the start event;
   detecting occurrence of the start event;
   executing the first trigger;
   collecting log data pertinent to the index code or ignoring log data not pertinent to the index code; or
   recording an index code start time associated with the collecting or the ignoring.

5. The method of claim 3, further comprising at least one of:
   associating the index code with the stop event;
   determining occurrence of the stop event;
   executing the second trigger to terminate collection of log data associated with the index code or terminate ignoring of log data not pertinent to the index code; or
   recording an index code stop time associated with executing the second trigger.

6. The method, of claim 3, further comprising tracking a number of start events that execute the first trigger and conditioning execution of the second trigger on occurrence of a number of stop events equal to the number of start events.

7. The method of claim 1, further comprising enabling multiple start events to execute the first trigger and multiple stop events to execute the second trigger, the multiple start and stop events are each associated with one or more index codes.

8. The method of claim 7, further comprising tracking a number of start or stop events associated with a first index code and conditioning terminating collection of log data associated with the first index code on occurrence of an equivalent number of stop events associated with the first index code.

9. The method of claim 1, further comprising:
defining an event flag that couples the first trigger with at least one of multiple second triggers; and
conditioning termination of log data collected as a result of the first trigger on execution of one of the multiple second triggers that is coupled with the first trigger by the event flag.

10. The method of claim 1, further comprising:
providing a continuous logging trigger that initiates perpetual recording of log data independent of the start event and the stop event; and
optionally employing a particular sampling rate, distinct from an event-triggered sampling rate, for collection of log data initiated by the continuous logging trigger.

11. The method of claim 1, further comprising employing a triggered sampling rate for collection of log data initiated by the first trigger.

12. An apparatus that provides continuous event-controlled code logging for a mobile operating environment, comprising:
a logging module configured to continuously collect log data in a mobile device OS;
a management module configured to establish a first trigger that initiates collection of the log data and a second trigger that terminates collection of the log data; and
a processor that conditions execution of the first trigger on occurrence of a start event and execution of the second trigger on occurrence of a stop event, wherein at least one of the start event or the stop event is associated with a non-hardware start-up or a non-hardware shut down operation of a mobile device, and wherein the start and stop event are determinable by an application or process of the mobile OS or a remote network component, or both, and wherein the processor provides a second application or process with access to selected ones of the continuously collected log data, selected based on a sampling function.

13. The apparatus of claim 12, further comprising a detection and timing module configured to record a log collection start time upon execution of the first trigger or record a log collection stop time upon execution of the second trigger, or both.

14. The apparatus of claim 12, further comprising an index parsing module that employs an index code that categorizes mobile OS log data to limit the collection or the termination of the collection, or both, to log data that is pertinent to the index code.

15. The apparatus of claim 14, wherein at least one of:
the management module is further configured to associate the index code with the start event;
a detection and timing module is configured to determine occurrence of the start event;
the processor executes the first trigger;
the logging module is configured to collect log data pertinent to the index code or ignores log data not pertinent to the index code; or
the detection and timing module is configured to record an index code start time upon collection of the log data pertinent to the index code.

16. The apparatus of claim 14, wherein at least one of:
the management module is further configured to associate the index code with the stop event;
a detection and timing module is configured to determine occurrence of the stop event;
the processor is configured to execute the second trigger to terminate collection of log data associated with the index code; or
the detection and timing module is configured to record an index code stop time upon termination of collection of the log data pertinent to the index code.

17. The apparatus of claim 12, wherein the processor is configured to enable multiple start events to execute the first trigger and multiple stop events to execute the second trigger, the multiple start and stop events are each associated with one or more index codes that categorize mobile OS log data.

18. The apparatus of claim 17, further comprising a reference module that tracks a number of start events and stop events associated with a first index code, wherein the processor conditions termination of log data associated with the first index code on occurrence of a number of the stop events equivalent to a number of the start events.

19. The apparatus of claim 12, wherein the processor tracks a number of start events that execute the first trigger and conditions execution of the second trigger on occurrence of a number of stop events equal to the number of start events.

20. The apparatus of claim 12, wherein:
the management module is further configured to define an event flag that couples the first trigger with at least one of multiple second triggers; and
the processor conditions termination of log data collection initiated by the first trigger on execution of one of the multiple second triggers that is coupled to the first trigger by the event flag.

21. The apparatus of claim 12, wherein at least one of:
the logging module includes a continuity trigger that, once initiated, records log data independent of the start event and the stop event; or
the logging module optionally employs a particular sampling rate for collection of log data initiated by the continuous logging trigger different from a triggered sampling rate utilized for event-controlled logging.

22. The apparatus of claim 12, wherein the logging module employs a triggered sampling rate for collection of log data initiated by the first trigger.

23. A processor configured to provide programmable event-controlled continuous code logging for a mobile device OS, comprising:
a first hardware module configured to establish a first trigger that initiates continuous collection of mobile OS log data;
a second module configured to establish a second trigger that terminates collection of the log data; and
a third module configured to condition execution of the first trigger and the second trigger on occurrence of a start event and a stop event, respectively, wherein at least one of the start event or the stop event is associated with a non-hardware start-up or a non-hardware shut down operation of a mobile device, and wherein the start event and stop event are determinable by an application or process of the mobile OS; and a fourth module configured to provide a second application or process with access to selected ones of the continuously collected log data, selected based on a sampling function.

24. An apparatus configured to provide programmable event-controlled continuous code logging for a mobile device OS, comprising:
   means for establishing a first trigger that initiates continuous collection of mobile OS log data;
   means for establishing a second trigger that terminates collection of the log data; and
   means for conditioning execution of the first trigger and the second trigger on occurrence of a start event and a stop event, respectively, wherein at least one of the start event or the stop event is associated with a non-hardware start-up or a non-hardware shut down operation of a mobile device, and wherein the start event and stop event are determinable by an application or process of the mobile OS; and
   means for providing a second application or process with access to selected ones of the continuously collected log data, selected based on a sampling function.

25. A computer program product, comprising:
   a non-transitory computer-readable medium containing instructions configured to provide programmable event-controlled continuous code logging for a mobile device OS, comprising:
   at least one instruction configured to cause a computer to establish a first trigger that initiates continuous collection of mobile OS log data;
   at least one instruction configured to cause the computer to establish a second trigger that terminates collection of the log data; and
   at least one instruction configured to cause the computer to condition execution of the first trigger and the second trigger on occurrence of a start event and a stop event, respectively, wherein at least one of the start event or the stop event is associated with a non-hardware start-up or a non-hardware shut down operation of a mobile device, and wherein the start event and stop event are determinable by an application or process of the mobile OS; and
   at least one instruction configured to cause the computer to provide a second application or process with access to selected ones of the continuously collected log data, selected based on a sampling function.

26. A method for configuring event-controlled log data compiled at one or more mobile OSs, comprising:
   sending a query to a mobile device requesting log data from the mobile device;
   sending a configuration parameter that specifies at least one event that is determinable by an OS of the mobile device, occurrence of the at least one event triggers termination of continuous log data collection; and
   receiving collected log data from the mobile device, wherein continuous collection of the log data is based on selection according to a sampling function, and wherein the continuous collection of the log data at the mobile device was terminated upon occurrence of the at least one event.

27. The method of claim 26, further comprising specifying at least one start event that is determinable by the OS of the mobile device with the configuration parameter, wherein occurrence of the at least one start event is utilized to trigger collection of the log data.

28. The method of claim 26, further comprising including an index code, which categorizes log data of a mobile OS, with the at least one event, the index code limits the termination of log data collection to a category of log data associated with the index code.

29. The method of claim 26, further comprising including an event flag with the configuration parameter that pairs the at least one event with at least one start event that initiates collection of log data, the event flag limits termination of log data collection resulting from occurrence of the at least one event to log data initiated by the at least one start event.

30. The method of claim 26, further comprising utilizing the received log data in conjunction with a diagnostic, management or maintenance function of a network, or a combination thereof.

31. The method of claim 26, further comprising forwarding the received log data to a network service provider or a component thereof.

32. An apparatus that programs event-controlled log data, comprising:
   a transceiver that communicatively couples with at least one mobile device;
   memory that contains a diagnostic application configured to send a query to the at least one mobile device requesting log data, and configured to provide a parameter identifying at least one event, the occurrence of the at least one event can be utilized to terminate continuous collection of the log data while the mobile device maintains functional capability, wherein selection of log data for continuous collection is based on a sampling function; and
   a processor that executes the diagnostic application and transmits and receives information related to the query and the configuration parameter.

33. The apparatus of claim 32, wherein the diagnostic application is further configured to specify at least one start event, wherein occurrence of the at least one start event is utilized to initiate collection of the log data.

34. The apparatus of claim 32, wherein the diagnostic application is further configured to include at least one index code with the at least one event, the at least one index code limits the termination of log data collection to log data that is pertinent to an index code of the OS.

35. The apparatus of claim 32, wherein the diagnostic application is further configured to include an event flag with the configuration parameter that pairs the at least one event with at least one start event that initiates collection of data, the event flag limits termination of log data collection resulting from occurrence of the at least one event to log data initiated by the at least one start event.

36. The apparatus of claim 32, wherein the diagnostic application is further configured to utilize the received log data in conjunction with a diagnostic, management or maintenance function of a network, or a combination thereof.

37. The apparatus of claim 32, wherein the diagnostic application is further configured to forward the received log data to a network service provider or a component thereof.

38. A processor configured to direct event-controlled log data compiled at one or more mobile OSs, comprising:
   a first hardware module configured to send a query to a mobile device requesting log data from the mobile device;
   a second module configured to specify at least one event that is determinable by an OS of the mobile device, occurrence of the at least one event triggers termination of continuous log data collection while the mobile device maintains functional capability, wherein log data is selected for the continuous collection based on a sampling function; and a third module configured to execute a diagnostic application and transmit and receive information related to the query and a configuration parameter.

39. An apparatus configured to program event-controlled log data compiled at one or more mobile OSs, comprising:
- a first hardware module configured to send a query to a mobile device requesting log data from the mobile device;
- a second module configured to specify at least one event that is determinable by an OS of the mobile device, occurrence of the at least one event triggers termination of continuous log data collection while the mobile device maintains functional capability, wherein log data is selected for the continuous collection based on a sampling function; and
- a third module configured to execute a diagnostic application and transmit and receive information related to the query and a configuration parameter.

40. A computer program product, comprising:
- a non-transitory computer-readable medium containing instructions configured to provide configuration of event-controlled log data compiled at one or more mobile OSs, comprising:
- at least one instruction configured to cause a computer to send a query to a mobile device requesting log data from the mobile device;
- at least one instruction configured to cause the computer to specify at least one event that is determinable by an OS of the mobile device, occurrence of the at least one event triggers termination of continuous log data collection while the mobile device maintains functional capability, wherein log data is selected for the continuous collection based on a sampling function; and
- at least one instruction configured to cause the computer to execute a diagnostic application and transmit and receive information related to the query and a configuration parameter.

* * * * *